Figures 1, 2:
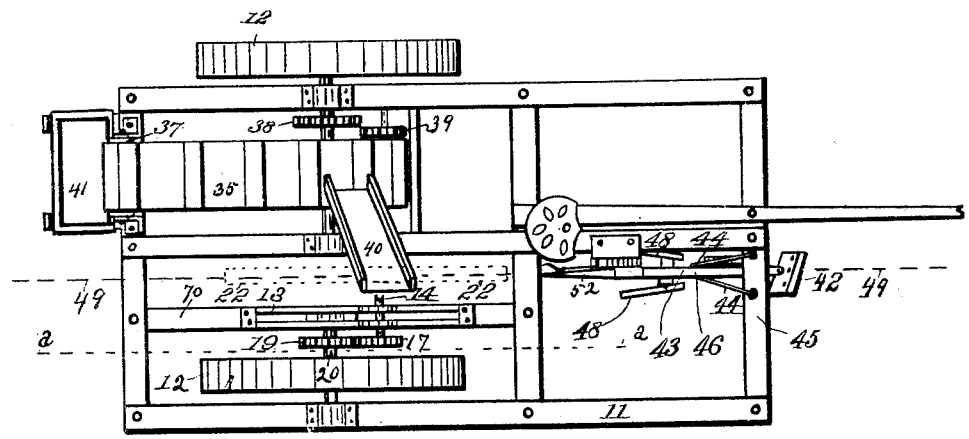

No. 675,473. Patented June 4, 1901.
U. M. FOX.
SUGAR BEET TOPPING AND PULLING MACHINE.
(Application filed Nov. 23, 1899.)
(No Model.) 2 Sheets—Sheet 1.

WITNESSES:
Levi F. Cox.
P. Knight Perkins.

INVENTOR.
BY Url M. Fox,
Lucius C. West.
ATTORNEY.

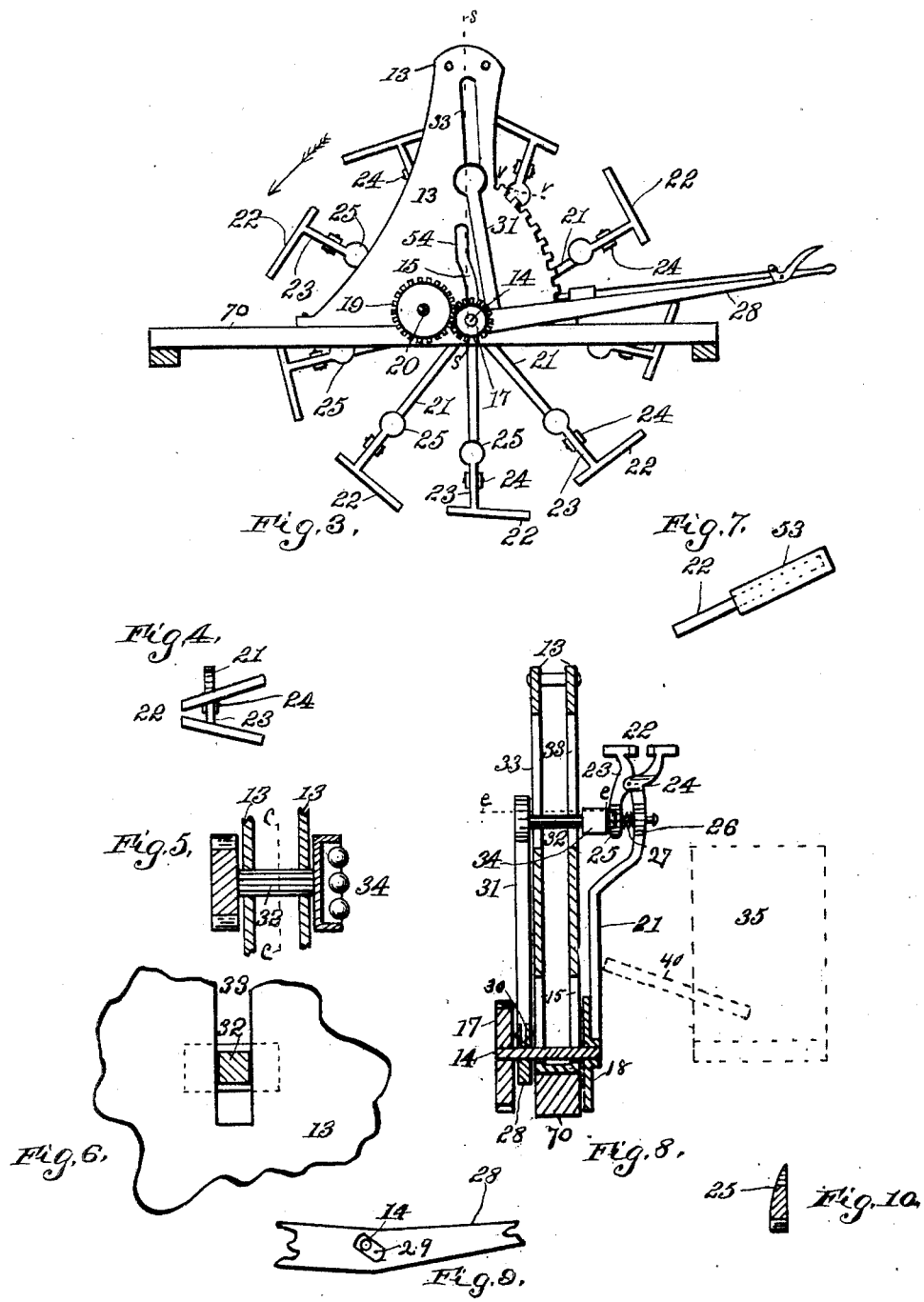

UNITED STATES PATENT OFFICE.

URL M. FOX, OF ROCHESTER, MICHIGAN.

SUGAR-BEET TOPPING AND PULLING MACHINE.

SPECIFICATION forming part of Letters Patent No. 675,473, dated June 4, 1901.

Application filed November 23, 1899. Serial No. 738,094. (No model.)

*To all whom it may concern:*

Be it known that I, URL M. FOX, a citizen of the United States, residing at Rochester, in the county of Oakland, State of Michigan, have invented a new and useful Sugar-Beet Topping and Pulling Machine, of which the following is a specification.

This invention has for one object the production of a machine which cuts off the tops of the beets, plows the earth away from the sides of the rows of beets, pulls the beets from the ground, and elevates and delivers them into a receptacle carried on the machine to receive them, thus virtually harvesting and crating the beets all in a single machine during a single operation back and forth across the field.

Other objects will appear in the description and claim, having reference to particular points of construction of said machine.

It is believed that such a machine will be found very useful and desirable in the gathering of the beets from which sugar is made and now being quite extensively raised in different parts of the United States and also in different countries of the world.

In the drawings forming a part of this specification, Figure 1 is a plan of the frame of the machine and containing parts of its construction; Fig. 2, a side elevation of Fig. 1; Fig. 3, an enlarged section on line *a a* in Fig. 1 and showing the beet pulling and elevating part of the machine, the position of which is shown in dotted lines in Figs. 1 and 2, hereinafter described. Fig. 4 is a plan of any one of the beet-pulling forks, but perhaps more particularly the one in Fig. 8; Fig. 5, an enlarged section on line *e e* in Fig. 8 looking from a point above, with parts broken, showing the part of the machine which opens the pulling-forks to allow the beets to drop out when in their highest elevated position; Fig. 6, a section on line *c c* in Fig. 5, showing a portion of the upright plate 13 in Figs. 1, 3, 5, and 8 broken away; Fig. 7, a detached member of one of the beet-pulling forks, showing a feature described below; Fig. 8, an enlarged section on line *s s* in Fig. 3 looking from a point at the right; Fig. 9, an enlarged broken part of the lever in Fig. 3, below more fully described; and Fig. 10 is a section on line *v v* in Fig. 3 and near line *e e* in Fig. 8, looking from a point above and showing the shape in section of the tripped portion of the pulling-forks.

Referring to the parts of the drawings pointed out by numerals, 11 in Figs. 1 and 2 is the tongued frame of the machine, to which a team is to be attached to draw it back and forth across a field, and 12 in said figures represents the ordinary traction-wheels for supporting in a propellable manner the machine. At 13 is an upright framework composed of two parallel plates mounted upon the beam 70 of the frame 11. A shaft 14 passes through a slot 15 of said plates 13 and is vertically movable in the slot 15 of said plates 13. At one end of this shaft 14 is attached a gear 17 and at the other end a spider 18, the gear being shown in Figs. 1 and 3 and more especially in section in Fig. 8. The spider 18 is shown in section in Fig. 8. The shaft 14 is driven by the gear 19 of the axle 20, which meshes with the gear 17, Figs. 1 and 3. The shaft 14 is shown broken in Fig. 1 and the spider 18 does not appear in said figure.

Attached to the spider 18 are the ends of the radial arms 21 of the pulling-forks 22. The pulling-forks 22 consist of two bars at oblique or diverging angles to each other, as in Fig. 4, one of the bars terminating the upper end of the arm 21 and the other bar terminating the upper end of a short bar 23, said short bar 23 being pivoted at 24 to the arm 21, Fig. 8. The lower end of said short bar terminates in an enlargement 25, and opposite to it on the arm 21 is an enlargement 26. Between these enlargements 25 and 26 is a spring 27, Fig. 8, which spring contracts when the pulling-forks open, as explained in the operation.

Pivoted to the shaft 20 is the end of lever 28, and the shaft 14 passes through an elongated slot 29 in said lever 28, as in Fig. 9.

Pivotally attached to lever 28 at 30, Fig. 8, is an upright bar 31. Attached to the upper end of this bar is a rod square in cross-section, as in Fig. 6. Said rod 32, Figs. 5, 6, and 8, passes through an upright elongated slot 33 in the upright plates 13 in a horizontal position and is provided at the end with a box of antifriction balls or rollers 34, Figs. 5 and 8.

The side of the enlargement 25 of the short bars 23 which comes next to the friction-balls 34 in the operation is beveled, as in Fig. 10, so as to come in contact with the antifriction-balls without jarring and to preserve a sufficiently long contact to allow of the forks opening to drop the beets.

At 35 is an elevator of usual form mounted on rollers 36 and 37 and driven by the gear 38 of the other traction-wheel and the gear 39 of the roller 36, Figs. 1 and 2. An incline bridge 40 is shown in Fig. 1 and dotted in in Fig. 8 to receive the beets from the pulling-forks and deliver them onto the elevator, which elevator in turn carries the beets and delivers them into the tray 41, beneath the upper end of the elevator, as in Figs. 1 and 2.

Before the beets are taken from the ground the tops are cut off by knife 42, Figs. 1 and 2. This knife is attached to the forward end of beam 43. This beam is sustained by rods 44, pivotally attached to the frame at 45 and to the beam 43 at 46. To the end of beam 43 is attached the standard 47, and to the lower end of the standard are attached the diverging shares 48. They diverge so that one share or blade will come on one side of the row of beets and another on the other, as in Fig. 1, in said Fig. 1 the dotted line 49 representing a row of beets.

A bar 50 is attached to the shares 48 and extends up and is pivotally attached at 51 to the angled lever 52, Fig. 2. By carrying the lever 52 forward the shares 48 and knife 42 will be carried backward and upward, thus freeing them from the ground or regulating their depth in the soil or nearness to it.

The position the puller-forks occupy is shown by the dotted lines marked 22 in Figs. 1 and 2.

In the operation the puller-forks revolve in the direction of the arrows in Figs. 2 and 3 or from the front of the machine over toward the rear. The knife 42 cuts off the tops of the beets in the row 49. The shares or blades 48 remove the soil each side of the row, and the prongs of the forks come each side of the beets, and as they converge toward each other rearwardly they catch the beets and carry them upward until the antifriction-wheels 34 are struck by the enlargements 25 of the forks 22, when the forks are thus opened and the beets drop onto the bridge 40 and are carried to the crate by the elevator, as stated.

It is thought desirable that a rubber tube 53 be placed on the prongs of the forks 22, as in Fig. 7, to prevent any marring of the beets.

The lever 28 governs the depth the pulling-forks run in the ground by raising or lowering said lever. When the lever 28 is raised, the bar 32 moves up the slot 33 of the plates 13. Thus the tripping antifriction-balls 34 are always at the right location when thus adjusting said parts. The shaft 14 passes up the slot 15 of the plates 13, and when carried into the upper vertical branch 54 of said slot, Fig. 3, the gears 17 and 19 will be taken out of mesh with each other as when going from one location to another and not operating on the beets.

Having thus described my invention, what I claim as new, and desire to secure by Letters Patent of the United States, is—

The combination of the wheeled frame, a spider mounted thereon provided with the hinged spring-actuated pulling-forks, the upright plates on said frame provided with the elongated slot, a lever for controlling the depth the pulling-forks enter the ground, a bar pivotally attached to said lever and provided at the end with the rod in said elongated slot of the plates said rod being movable up and down in said slot when the controlling-lever is operated, a box of antifriction-rollers attached to the end of said rod and in a position that one of the hinged fork-prongs will be tripped by coming in contact with the antifriction-rollers when the forks are in an elevated position and at whatever height of adjustment by the controlling-lever, substantially as set forth.

In testimony of the foregoing I have hereto set my hand in the presence of two witnesses.

URL M. FOX.

Witnesses:
LUCIUS C. WEST,
LEVI F. COX.